(12) United States Patent
Wunsch

(10) Patent No.: US 8,453,825 B2
(45) Date of Patent: Jun. 4, 2013

(54) BELT CONVEYOR WITH A MODULAR INTERMEDIATE DRIVE BELT

(75) Inventor: Philip J Wunsch, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 299 days.

(21) Appl. No.: 12/884,294

(22) Filed: Sep. 17, 2010

(65) Prior Publication Data

US 2011/0073444 A1 Mar. 31, 2011

Related U.S. Application Data

(60) Provisional application No. 61/247,000, filed on Sep. 30, 2009.

(51) Int. Cl.
*B65G 23/16* (2006.01)

(52) U.S. Cl.
USPC .......................... 198/697; 198/833; 198/853

(58) Field of Classification Search
USPC .................. 198/697, 833, 850–853
See application file for complete search history.

(56) References Cited

U.S. PATENT DOCUMENTS

| | | | |
|---|---|---|---|
| 1,279,579 A | 9/1918 | Perkins | |
| 1,960,719 A | 5/1934 | Stibbs | |
| 2,309,587 A * | 1/1943 | Hassler | 198/684 |
| 2,609,086 A | 9/1952 | McBride et al. | |
| 3,033,353 A | 5/1961 | Burnett et al. | |
| 3,534,848 A * | 10/1970 | Marks et al. | 198/697 |
| 3,877,567 A * | 4/1975 | Sommerfield | 198/833 |
| 3,994,390 A | 11/1976 | Peterson, Jr. et al. | |
| 4,082,173 A | 4/1978 | Simon-Kochloffel | |
| 4,132,304 A * | 1/1979 | Gent et al. | 198/432 |
| 5,303,817 A | 4/1994 | Kissee | |
| 6,868,747 B2 | 3/2005 | Göser et al. | |
| 7,874,418 B2 | 1/2011 | Steinstraeter et al. | |
| 2010/0200365 A1 * | 8/2010 | Pressler et al. | 198/460.1 |

FOREIGN PATENT DOCUMENTS

| | | |
|---|---|---|
| BE | 626173 A | 6/1963 |
| DE | 885228 C | 8/1953 |
| DE | 956472 C | 1/1957 |
| NL | 273731 A | 9/1964 |
| NL | 6906706 A | 11/1969 |
| WO | 9314010 A1 | 7/1993 |
| WO | 2008070444 A2 | 6/2008 |

OTHER PUBLICATIONS

ISA/EP International Search Report and Written Opinion of the International Searching Authority of PCT/US10/49202, mailed Jan. 20, 2011, European Patent Office, Rijswijk, NL.

* cited by examiner

*Primary Examiner* — Mark A Deuble
(74) *Attorney, Agent, or Firm* — James T. Cronvich

(57) ABSTRACT

An intermediate drive system for driving a conveyor belt with one or more intermediate drive belts. The intermediate drive belt includes lateral rows of pivotable teeth spaced apart along the length of the intermediate drive belt. The teeth extend into the conveyor belt along a portion of the carryway to drive the conveyor belt in a conveying direction. The only component external to the intermediate drive belt that the teeth contact is the intermediate drive belt. Engagement and disengagement of the teeth with the conveyor belt is effected without the use of cams against the teeth.

26 Claims, 4 Drawing Sheets

BELT CONVEYOR WITH A MODULAR INTERMEDIATE DRIVE BELT

CROSS-REFERENCE TO RELATED APPLICATIONS

This application claims the priority of U.S. Provisional Patent Application No. 61/247,000, "Belt Conveyor with a Modular Intermediate Drive Belt," filed Sep. 30, 2009, and incorporated into this application by reference.

BACKGROUND

The invention relates generally to power-driven conveyors and more particularly to conveyor belts driven by one or more intermediate drive belts.

Intermediate drive belts are often used to drive conveyor belts on long or winding conveyor paths. These intermediate drive belts are short belts with drive teeth that engage the conveyor belt at strategic locations along the conveying path. In this way, part of the load is transferred from the main drive sprockets, which are typically located at the end of the conveyor carryway or in the return, to the intermediate drive belt. Because the maximum tension in a conveyor belt with intermediate drives is lower than in a conveyor belt without, a less expensive conveyor belt with a lower belt-pull rating can be used or the conveyor belt can be used for longer runs.

Some of the problems associated with conventional intermediate drive belts include: excessive wear caused by rubbing between the intermediate-drive teeth and cam surfaces acted on by the teeth; tenting of the intermediate drive belt where it engages the conveyor belt; and the need for hold downs to counteract the tendency of the intermediate drive to push the conveyor belt upward. And many intermediate drive belts and chains have pivotable teeth with cam followers that slide or roll on cam surfaces as the teeth drive the conveyor belt. Sliding cam followers are especially susceptible to wear, and rolling cam followers require more complicated roller assemblies.

SUMMARY

These shortcomings are overcome by a conveyor embodying features of the invention including a conveyor belt driven by an intermediate drive belt along a carryway. The conveyor belt has a top conveying side and an opposite bottom side and static drive-receiving surfaces accessible from the bottom side. The intermediate drive belt advances along the carryway in a conveying direction and includes a bottom surface and an opposite top surface underlying the bottom side of the conveyor belt along a portion of the carryway. Teeth are mounted at laterally spaced apart locations across the width of the intermediate drive belt and rotate about lateral pivot axes through a range of rotation. Each of the teeth includes a drive face above the top surface of the intermediate drive belt and an arm having a reaction surface on the opposite side of the pivot axis from the drive face. The arm resides entirely between the top and bottom surfaces of the intermediate drive belt throughout the range of rotation of the tooth. In this way, the arm does not rub against any conveyor components outside the intermediate drive belt.

In another aspect of the invention, an intermediate drive belt comprises a top surface and a parallel bottom surface defining its thickness. Teeth are mounted at laterally spaced apart locations across the width of the intermediate drive belt to rotate through a range of rotation about lateral pivot axes, which are disposed between the top and bottom surfaces of the belt. Each of the teeth has a drive face above the top surface of the intermediate drive belt and an arm having a reaction surface on the opposite side of the pivot axis from the drive face. Stops disposed between the top and bottom surfaces engage corresponding reaction surfaces at an extreme of the range of rotation of the teeth.

Another aspect of the invention provides a belt module having a top surface and an opposite bottom surface defining the module's thickness. Teeth are mounted at laterally spaced apart locations across the width of the belt module to rotate about a lateral pivot axis through a range of rotation. Each of the teeth includes a drive face above the top surface of the belt module and an arm having a reaction surface on the opposite side of the pivot axis from the drive face. The arm resides entirely within the thickness of the belt module throughout the range of rotation of the tooth.

In yet another aspect of the invention, a belt module comprises a top surface and an opposite bottom surface. Teeth are mounted at laterally spaced apart locations across the width of the belt module to rotate about a lateral pivot axis. Each of the teeth includes a driving arm having a drive face above the top surface of the belt module and a reaction arm having a reaction surface on the opposite side of the pivot axis from the driving arm. The drive face and the reaction surface define an angle of less than 180°.

BRIEF DESCRIPTION OF THE DRAWINGS

These aspects, features, and advantages of the invention are described in more detail in the following description, appended claims, and accompanying drawings, in which:

DETAILED DESCRIPTION

Figure 1A:
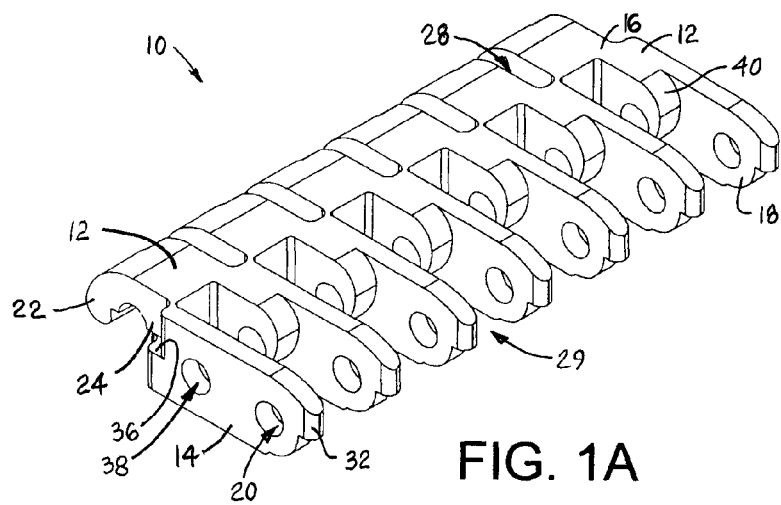
FIGS. 1A-1E are top isometric, bottom isometric, top plan, side elevation, and front elevation views of a base module embodying features of the invention for use in constructing an intermediate drive belt.
Figure 1B:
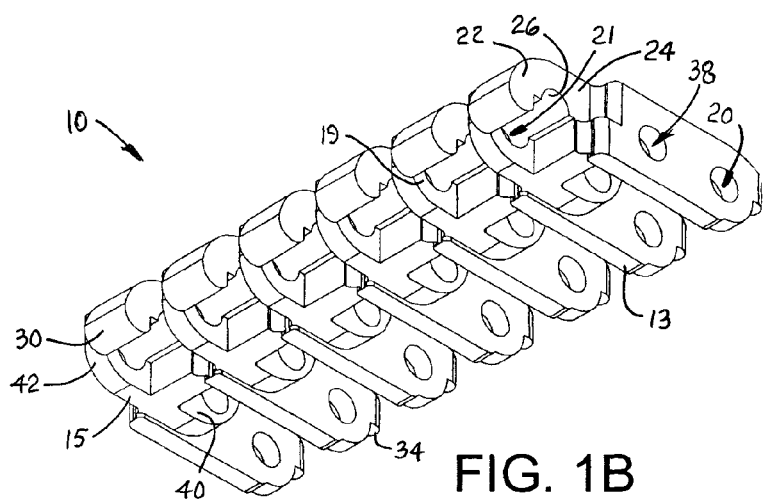
Figure 1C:
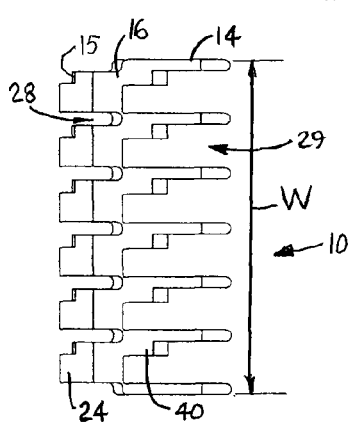
Figures 1D, 1E:
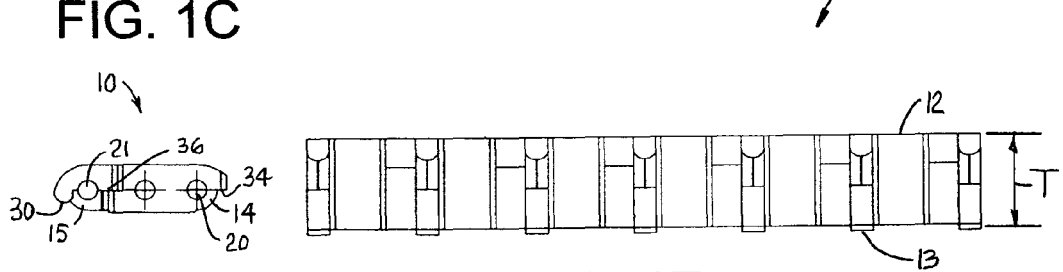

A base module for an intermediate drive belt embodying features of the invention is shown in FIGS. 1A-1E. The base module 10, which is preferably injection molded out of a thermoplastic polymer, such as polyethylene, polypropylene, acetal, and composite polymers, has a top surface 12 and an opposite bottom surface 13 through its thickness T. Long links 14, laterally spaced apart across the width W of the base module, extend forward from an intermediate portion 16 of the base module. Shorter links 15 extend rearward from the intermediate portion. The shorter links 15 are laterally offset from the long links 14. Both sets of links 14, 15 form hinge elements having hinge structure 18, 19 including lateral holes 20, 21.

Stops 22 are formed at distal ends of projections 24 extending from the intermediate portion 16 of the module and forming a portion of the top surface 12 of the module. Each projection has a semicircular recess 26 continuous with the top half of the lateral hole 21 through an abutting shorter link 15. A gap 28 between the side of each projection 24 and the next consecutive shorter link 15 is sized to receive the long link 14 of an adjacent interconnected belt module 10. Similarly, wider gaps 29 between consecutive long links 14 are sized to receive the conjoined pairs of shorter links 15 and projections 24. The projections terminate in the stops 22, which have laterally elongated curved surfaces 30 at their distal ends.

An overhanging ledge 32 extends forward from the distal end of each long link 14. An undercut flat surface 34 forms the bottom of each ledge. A seat 36 is formed on the proximal end of each long link 14 in the intermediate portion 16 of the module inward of the module's rearward end. A lateral hole 38 is formed in each long link 14 between the seat 36 and the ledge 32. Bosses 40 reinforcing the sides of the long links 14 at their proximal ends form continuations of the second holes 38.

Figure 2:
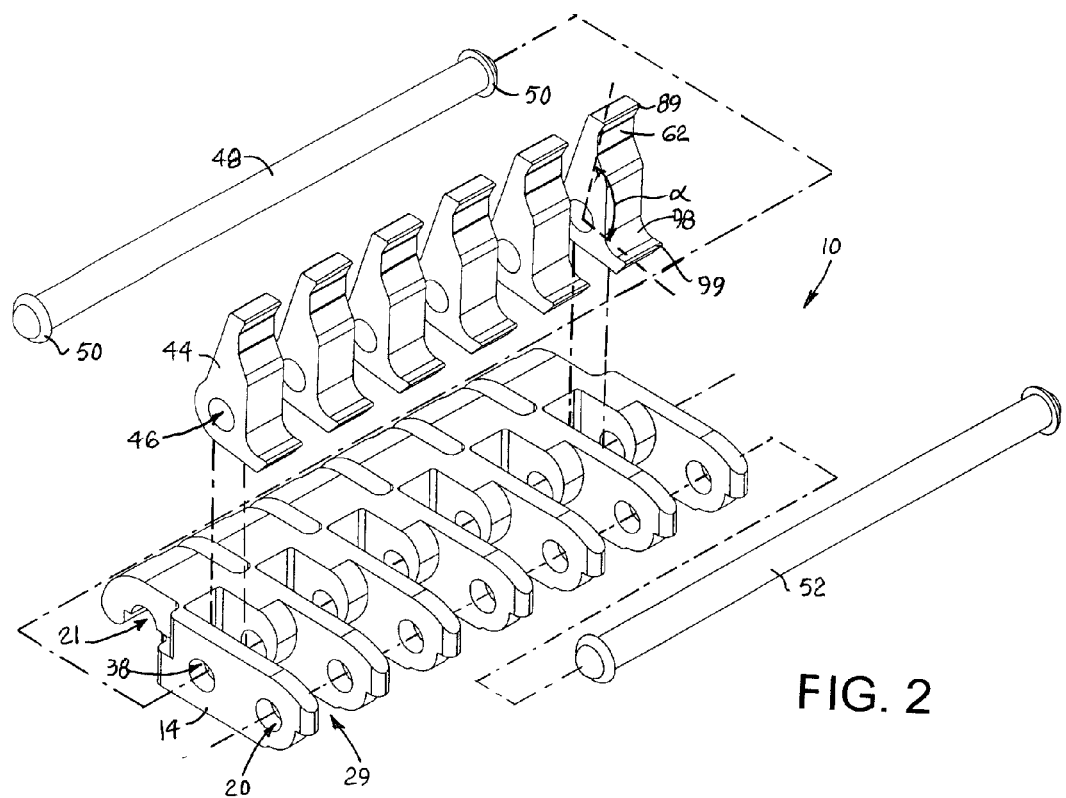
FIG. 2 is an exploded view of the base module of FIG. 1 with drive teeth.

As shown in FIG. 2, teeth 44 are mounted at the rear of the gaps 29 between the long links 14. Bores 46 through the teeth 44 align with the second holes 38 in the long links to form a lateral passageway across the width of the base module 10. A pivot rod 48 is received in the passageway and retains all the teeth pivotably to the module. Both ends of the pivot rod have heads 50 that hold the rod in place. But headless rods with retention structure to capture the rods may be used as well.

Figure 3:
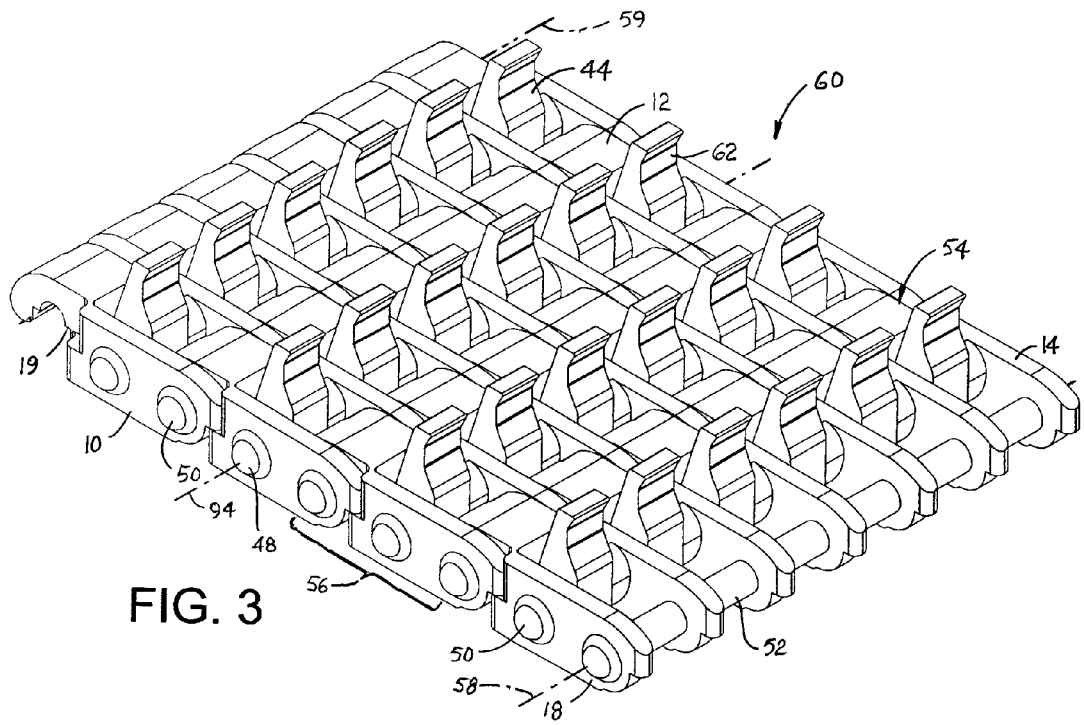
FIG. 3 is an isometric view of a portion of a modular intermediate drive belt embodying features of the invention, including modules as in FIG. 2.

A similar hinge rod 52 is used to interconnect adjacent belt modules 10 together at hinge joints 54 as shown in FIG. 3. The long links 14 along a forward end of a row 56 of one or more belt modules 10 interleave with the shorter links 15 and the joined projections 24 on the trailing end of a leading row. The lateral holes 20, 21 of the interleaved hinge structure 18, 19 are aligned on forward and rear lateral hinge axes 58, 59 and receive the hinge rods 52, which connect the modules together at the hinge joints 54 into an intermediate drive belt 60 that can articulate about the hinge axes. Drive faces 62 on the forward side of the teeth 44 are above the top surfaces 12 of the belt.

The operation of the intermediate drive belt 60 is shown in FIGS. 4-7 with regard to a conveying system. The conveying system 64 includes a conveyor belt 66, shown running in a conveying direction 68 along a portion of an upper carryway. Remotely located drive components, such as sprockets or drums (not shown) serve as the main drives of the conveyor belt. Intermediate drive components, such as the intermediate drive belt 60 shown in FIG. 4, engage the conveyor belt 66 at one or more locations along the carryway. The intermediate drive belt 66 is supported and rides in the conveying direction 68 on an intermediate drive carryway, or support platform 70, mounted to the conveyor frame (not shown for clarity) with bolts through holes 71 formed in vertical beams 73. The support platform 70 has an inclined ramp 72 leading to a horizontal support surface 74. The front end 76 of the support platform is rounded to guide the intermediate drive belt 60 smoothly from the lower return path onto the ramp. The rear end 78 of the support platform 70 is concave to provide clearance for one or more drive sprockets 80 having bores 82 for receiving a drive shaft (not shown) rotatably supported in the conveyor frame and driven by a motor (not shown). Sprocket teeth 84 on the peripheries of the sprockets 80 engage the rounded drive faces 42 formed on the distal ends of the shorter links 15 (FIG. 1B) to drive the intermediate drive belt 60 in the conveying direction. The intermediate-drive belt 66, the support platform 70, the sprockets 80, the drive shaft and other associated intermediated-drive components may be packaged as a drop-in module that can be installed on existing conveyor systems.

Figure 4:
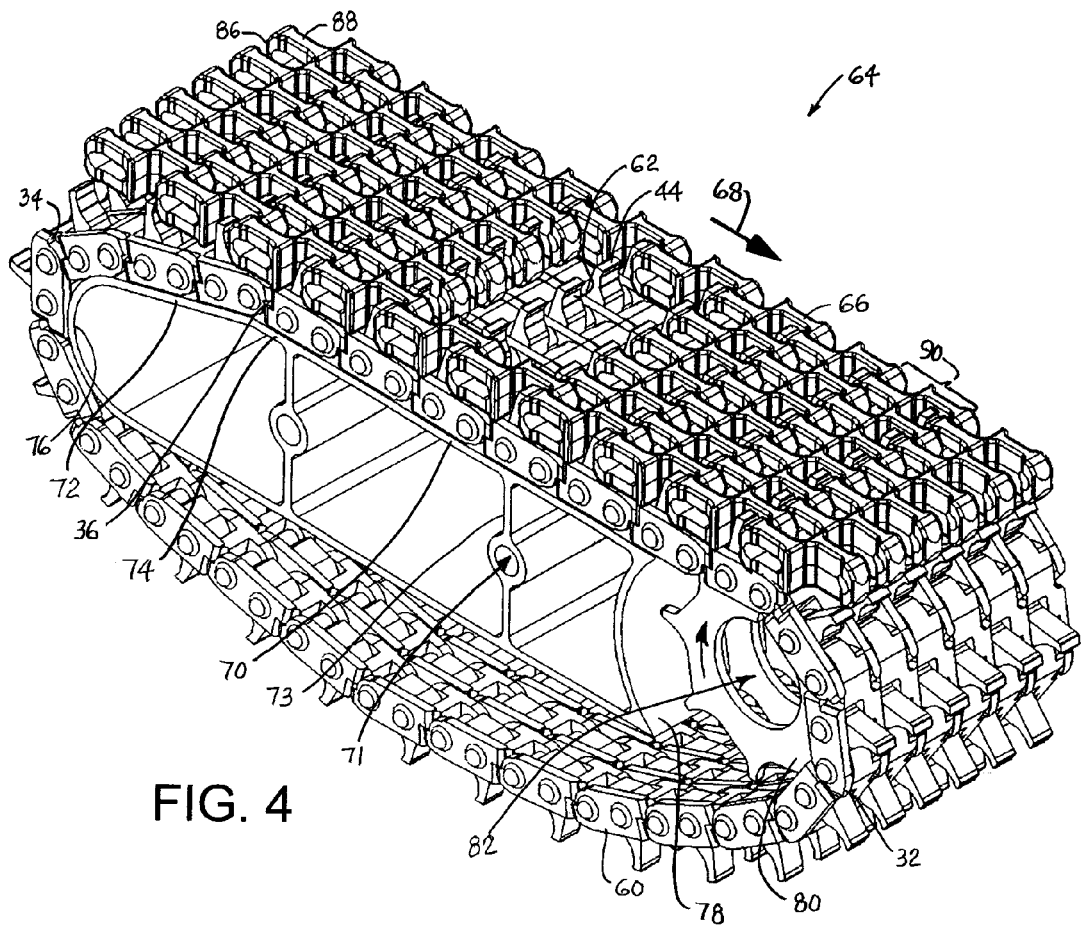
FIG. 4 is an isometric view of a carryway portion of a conveyor system embodying features of the invention in the vicinity of an intermediate drive belt as in FIG. 3.

As best shown in the partly cutaway view of FIG. 4, the intermediate drive belt's teeth 44 extend up into the conveyor belt 66. The drive faces 62 on the teeth push on outer drive-receiving surfaces 86 formed on trailing link ends 88 of each row 90 of conveyor belt modules. In this example, the pitch, i.e., the distance between consecutive hinge axes, of the intermediate drive belt 60 is roughly the same as, although preferably slightly greater than, that of the collapsible conveyor belt 66 in its fully-tensioned expanded state. Because each row of the intermediate drive belt 60 has a row of teeth 44, the tooth pitch, i.e., the distance between consecutive rows of teeth along the length of the intermediate drive belt, is the same as the pitch of the intermediate drive belt to provide a high density of engaging teeth along the length and across the width of the conveyor belt. Because of this high density of engagement points, the pressure and, consequently, the wear at each engagement point are reduced. This makes the use of plastic, rather than metal, teeth feasible. Of course, the tooth pitch can be increased by making the pitch of the intermediate drive belt roughly an integral multiple of the conveyor belt's pitch or by installing teeth only in every second, third, or fourth intermediate drive belt row.

Figure 6:
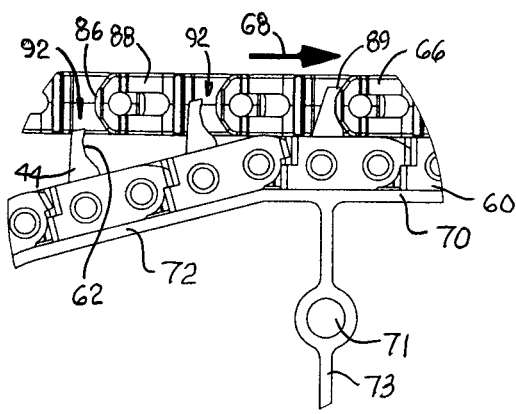
FIG. 6 is an enlarged side view of a portion of FIG. 5 showing the intermediate drive belt as it initially engages the conveyor belt.

The initial engagement of the intermediate drive belt 60 with the conveyor belt 66 is illustrated best in FIG. 6. As both belts advance in the conveying direction 68, the intermediate drive belt rides up the ramp 72. The teeth 44 enter into gaps 92 between the conveyor belt rows just aft of the trailing link ends 88. As the intermediate drive belt rides up the ramp, the teeth advance deeper and deeper into the gaps until they contact the static drive-receiving surfaces 86 on the trailing link ends 88. The drive faces 62 of the teeth are preferably shaped to mate with the drive-receiving surfaces 86 to maximize the contact area. The drive-receiving surfaces 86 of the conveyor belt and the drive faces 62 of the teeth 44 are generally perpendicular to the conveying direction 68. Thus, the conveyor belt is not pushed upward, and hold downs are not required. A hook, 89 at the top end of the tooth adds surface area to the drive face and provides any minor hold down force needed.

Figure 5:
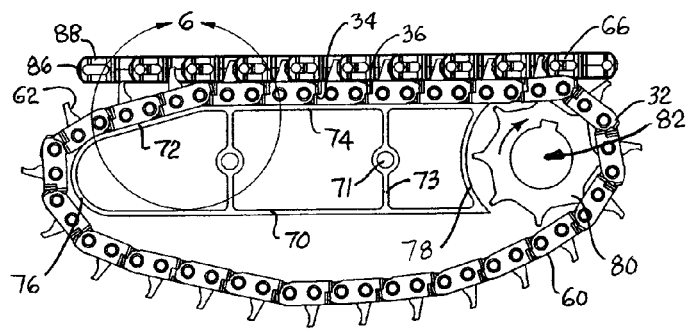
FIG. 5 is a side elevation view of the portion of the conveyor system of FIG. 4.

Along the horizontal support surface 74, the intermediate drive belt 60 is sandwiched between the conveyor belt 66 and the support platform 70 as shown in FIGS. 4 and 5. The undercut flat surfaces 34 of the overhanging ledges 32 at the forward end of each row of the intermediate drive belt 60 sit on the seats 36 of a leading row to form an interlocking engagement of the intermediate drive belt's rollers as they advance along the horizontal support surface 74. The interlocking structure forms backbend limiting means that, together with the horizontal support surface 74, restricts the backbending of the intermediate drive belt in the vicinity of those belt rows whose teeth are driving the conveyor belt. The reaction force of the conveyor belt on the drive faces 62 of the teeth tends to lift the leading end of the driving row and lower the trailing end. The backbend limiter limits backbending in the face of that tendency.

Figure 7:
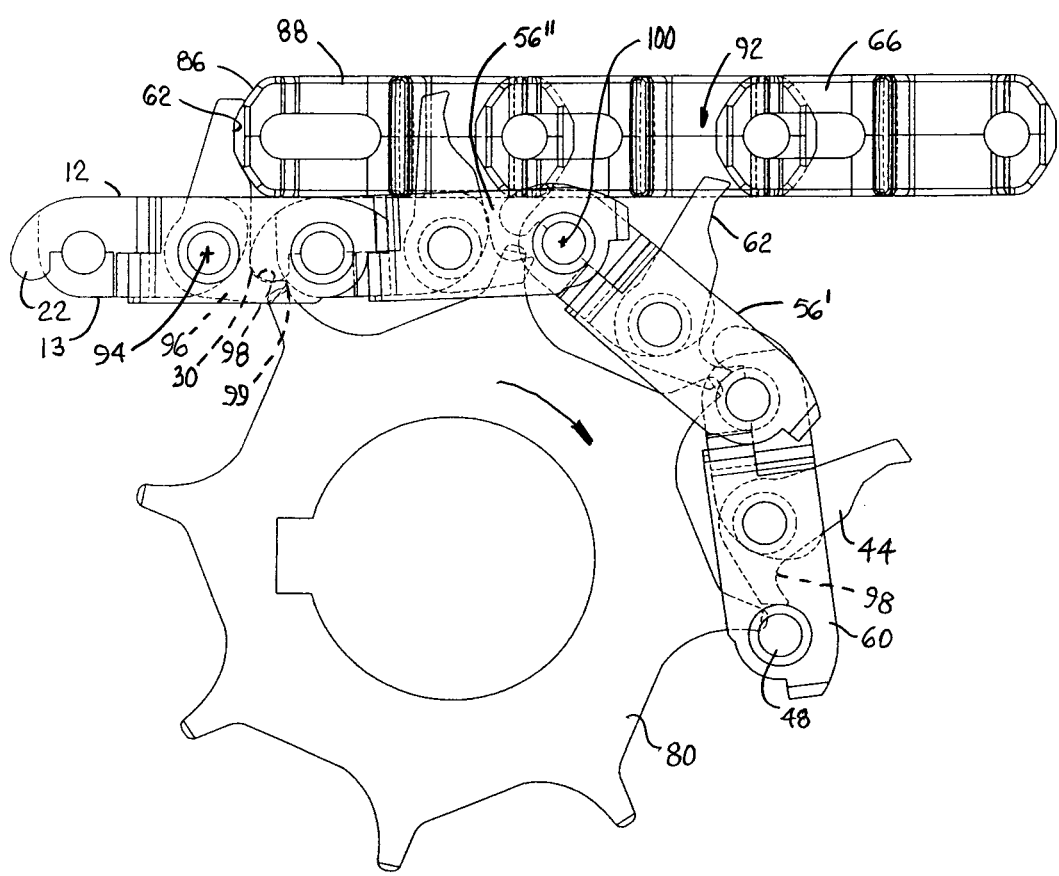
FIG. 7 is an enlarged side view, partly in phantom, of a portion of the conveyor system of FIG. 5 showing the disengagement of the intermediate drive belt from the conveyor belt.

As shown in FIG. 3, the pivot rod 48 defines the lateral pivot axis 94 about which the teeth 44 rotate. The pivot axis 94 in each row is preferably coplanar with the lateral hinge axes 58, 59. But the range of rotation is limited by structure in the intermediate drive belt as shown in FIG. 7. Each tooth is effectively a lever with a reaction arm 96 on the opposite side of the pivot axis 94 from the arm containing the drive face 62. The reaction arm 96 preferably extends generally perpendicular to the drive face 62 with an angle α between the arm 96 and the drive face 62 of less than 180° (FIG. 2). The arm 96 includes a concave reaction surface 98 that pushes against the laterally elongated convexly curved surface 30 on the stop 22 of a leading row when the tooth is driving the conveyor belt 66. A hook 99 at a distal end of the arm helps keep the reaction-arm end of the tooth engaged with the stop. The reaction force of the conveyor belt on the drive face of the tooth is transmitted to the stop 22 through the reaction surface 98 by lever action. Because the reaction arm 96 is forward of the pivot access, it lifts away from the bottom of the intermediate drive belt and into the stop as the tooth drives the conveyor belt. The reaction arm 96 is also shaped to reside within the intermediate drive belt's thickness between the top and bottom surfaces 12, 13 through the tooth's entire range of rotation. Thus, the only component external to the intermediate drive belt that the teeth contact is the intermediate drive belt. In this way, the arm of a driving tooth does not dig into the horizontal support surface 74 as it slides along. Rather, the reaction force is borne by the stop statically with no sliding friction. Consequently, contact and friction between the tooth and the support platform are eliminated.

The intermediate-drives teeth 44 disengage easily from the conveyor belt 66 as shown in FIG. 7. As the intermediate drive belt 60 articulates about its sprockets 80, a leading belt row 56' pivots clockwise relative to a trailing row 56" about their shared hinge axis 100. This lifts the leading row's stop 22 cleanly away from the trailing row's reaction surface 98. In the meantime, the tooth 44 is freely rotatable on its pivot axis 94 with its reaction arm unencumbered. In this way, the opposite arm that includes the tooth's drive face 62 cannot exert any significant force against the conveyor belt as the tooth exits the gap 92 between rows. The pivotable tooth is just pushed out of the way without resistance. Furthermore, no external cams are needed to guide the teeth into or out of engagement with the conveyor belt.

Thus, the invention provides features and advantages such as an intermediate drive system with a high density of drive surfaces for distributed, low drive pressures, nearly vertical tooth—conveyor contact to eliminate the need for hold downs, and no cam followers on the tooth or external cams. These features allow long conveyor belts to be operated even at high speeds.

Although the invention has been described with reference to a preferred version, other versions are possible. For example, the intermediate drive belt and all its components have been described to admit of all-plastic construction, but one or more of the belt's components could be made of metal. As another example, the details of the shape of the tooth represent only one exemplary tooth for use with the conveyor belt having the characteristic shown, i.e., that of an INTRALOX® Series 2200 or 2400 conveyor belt, manufactured and sold by Intralox, L.L.C. of Harahan, La., U.S.A. And intermediate drive belts of this kind may be used with straight-running belts as well as collapsible radius or spiral belts and with chains as well as belts. So, as these few examples suggest, the scope of the claims is not meant to be limited to the details of the preferred version.

What is claimed is:

1. A belt module comprising:
    a top surface and an opposite bottom surface defining the thickness of the belt module and an intermediate portion between opposite first and second ends;
    a plurality of stops spaced apart laterally across the width of the belt module along the first end between the top surface and the bottom surface;
    a plurality of teeth rotatably mounted in line with the stops and offset from the first end at laterally spaced apart locations across the width of the belt module in gaps opening onto the second end to rotate about a lateral pivot axis through a range of rotation, each of the teeth including a first arm having a drive face above the top surface of the belt module and a reaction arm having a reaction surface on the opposite side of the pivot axis from the drive face, wherein the drive face and the reaction surface define an angle of less than 180° and the reaction surface contacts the stop of an adjacent belt module when the tooth is rotated to one extreme of the range of rotation and contacts the intermediate portion at the rear of the gap at the other extreme of rotation to keep the reaction arm entirely within the thickness of the belt module throughout the range of rotation of the tooth.

2. A belt module as in claim 1 wherein the lateral pivot axis is disposed between the top and bottom surfaces of the belt module.

3. A belt module as in claim 1 comprising a single pivot rod extending across the width of the belt module and defining the lateral pivot axis, wherein the teeth are mounted on the single pivot rod.

4. A belt module as in claim 1 further comprising first hinge structure defining a first lateral hinge axis along the first end of the belt module and second hinge structure defining a second lateral hinge axis along the second end of the belt module opposite the first end, wherein the lateral pivot axis is coplanar with the first and second lateral hinge axes.

5. A belt module as in claim 1 wherein the reaction arm extends from the pivot axis in a direction perpendicular to the drive face of the tooth.

6. A belt module as in claim 1 wherein the reaction arm includes a hook at a distal end of the reaction arm.

7. A belt module as in claim 1 further comprising overhanging ledges along a first end of the belt module and seats disposed inward of an opposite second end of the belt module, wherein the ledges of a module sit on the seats of an adjacent module when the teeth of the module are driving a conveyor belt.

8. A belt module comprising:
    a top surface and an opposite bottom surface extending in length from a first end to a second end;
    a plurality of teeth rotatably mounted at laterally spaced apart locations across the width of the belt module to rotate about a lateral pivot axis, each of the teeth including a driving arm having a drive face above the top surface of the belt module and a reaction arm having a reaction surface on the opposite side of the pivot axis from the driving arm, wherein the drive face and the reaction surface define an angle of less than 180°;
    a plurality of stops spaced apart laterally across the width of the belt module between the top surface and the bottom surface and offset along the length of the belt module from the teeth, wherein each of the teeth is aligned with one of the stops.

9. A belt module as in claim 8 comprising a single pivot rod extending across the width of the belt module and defining the lateral pivot axis, wherein the teeth are mounted on the single pivot rod.

10. A belt module as in claim 8 wherein the reaction arm includes a hook at a distal end of the reaction arm.

11. A belt module as in claim 8 wherein the reaction arms extend from the pivot axis in a direction perpendicular to the drive faces of the teeth.

12. A belt module as in claim 8 wherein the plurality of stops is positioned to contact the teeth of an adjacent belt module to limit the range of rotation of the teeth.

13. A conveyor system as in claim 12 wherein the reaction surface of a tooth contacts one of the stops when the tooth is rotated to one extreme of the range of rotation.

14. An intermediate drive belt comprising:
a plurality of belt modules hingedly linked together into a series of rows;
a top surface and a parallel bottom surface defining the thickness of the belt modules;
a plurality of teeth rotatably mounted at laterally spaced apart locations across the width of the rows to rotate through a range of rotation about lateral pivot axes disposed between the top and bottom surfaces, each of the teeth including a first arm having a drive face above the top surface and a reaction arm having a reaction surface on the opposite side of the pivot axis from the drive face;
a plurality of stops spaced apart laterally across the width of the rows between the top and bottom surfaces, each of the stops aligned with one of the teeth;
wherein the drive face and the reaction surface of each tooth define an angle of less than 180° and the reaction surface contacts one of the aligned stops of an adjacent row when the tooth is rotated to an extreme of the range of rotation.

15. An intermediate drive belt as in claim 14 wherein the stops prevent the reaction arms from extending below the bottom surface of the belt modules.

16. An intermediate drive belt as in claim 14 comprising a plurality of pivot rods extending across the width of the intermediate drive belt and defining the lateral pivot axes, wherein the teeth are arranged in the lateral rows across the width of the intermediate drive belt with all the teeth in each of the rows rotatably mounted on the same pivot rod.

17. An intermediate drive belt as in claim 14 wherein each row has first hinge structure along a first end of each row and second hinge structure along an opposite second end wherein the first hinge structure of the rows is hingedly linked with the second hinge structure of adjacent rows to allow the intermediate drive belt to articulate about lateral hinge axes between consecutive rows.

18. An intermediate drive belt as in claim 17 wherein the lateral pivot axis of the tooth is coplanar with the lateral hinge axes.

19. An intermediate drive belt as in claim 17 wherein each of the stops is disposed in a row of the belt modules forward of and adjacent to the row of belt modules containing the corresponding reaction surfaces.

20. An intermediate drive belt as in claim 17 further comprising overhanging ledges along the first end of each row of belt modules and seats disposed inward of the second end of each row of belt modules, wherein the ledges of a row sit on the seats of an adjacent row when the teeth of the module are driving a conveyor belt.

21. An intermediate drive belt as in claim 14 wherein the reaction arms extend from the pivot axes in a direction perpendicular to the drive face of the tooth.

22. An intermediate drive belt as in claim 14 wherein each of the reaction arms includes a hook at a distal end.

23. An intermediate drive belt as in claim 14 wherein the stops prevent the reaction arms from extending below the bottom surface of the intermediate drive belt.

24. A conveyor system comprising:
a carryway;
a conveyor belt supported in the carryway and having a top conveying side and an opposite bottom side and static drive-receiving surfaces accessible from the bottom side;
an intermediate drive belt advancing along the carryway in a conveying direction and including:
a plurality of belt modules hingedly linked together into a series of rows having a bottom surface and an opposite top surface underlying the bottom side of the conveyor belt along a portion of the carryway;
a plurality of teeth rotatably mounted at laterally spaced apart locations across the width of the rows to rotate about lateral pivot axes through a range of rotation, each of the teeth including a first arm having a drive face above the top surface and a reaction arm having a reaction surface on the opposite side of the pivot axis from the drive face;
a plurality of stops spaced apart laterally across the width of the rows between the top and bottom surfaces, each stop aligned with one of the teeth;
wherein the drive face and the reaction surface of each tooth define an angle of less than 180° and the reaction surface contacts one of the aligned stops in an adjacent row when the tooth is rotated to an extreme of the range of rotation of the tooth.

25. A conveyor system as in claim 24 wherein the series of rows of belt modules having hinge elements at opposite leading and trailing ends of each row that form articulating hinge joints between adjacent rows and the intermediate drive belt further comprises:
backbend limiting means between adjacent rows to prevent the belt from backbending along the carryway.

26. A conveyor system as in claim 25 wherein the backbend limiting means comprises overhanging ledges along the leading end of each row and seats disposed inward of the trailing end of each row, wherein the ledges of the trailing row sit on the seats of the leading row along the carryway.

* * * * *